United States Patent
Koch et al.

(10) Patent No.: US 10,783,431 B2
(45) Date of Patent: Sep. 22, 2020

(54) IMAGE SEARCH USING EMOTIONS

(71) Applicant: Adobe Inc., San Jose, CA (US)

(72) Inventors: Zeke Koch, San Francisco, CA (US); Gavin Stuart Peter Miller, Los Altos, CA (US); Jonathan W. Brandt, Santa Cruz, CA (US); Nathan A. Carr, San Jose, CA (US); Radomir Mech, Mountain View, CA (US); Walter Wei-Tuh Chang, San Jose, CA (US); Scott D. Cohen, Sunnyvale, CA (US); Hailin Jin, San Jose, CA (US)

(73) Assignee: Adobe Inc., San Jose, CA (US)

( * ) Notice: Subject to any disclaimer, the term of this patent is extended or adjusted under 35 U.S.C. 154(b) by 534 days.

(21) Appl. No.: 14/938,752

(22) Filed: Nov. 11, 2015

(65) Prior Publication Data
US 2017/0132290 A1 May 11, 2017

(51) Int. Cl.
| G06F 17/30 | (2006.01) |
| G06N 3/08 | (2006.01) |
| G06F 16/583 | (2019.01) |
| G06N 20/00 | (2019.01) |
| G06N 5/02 | (2006.01) |

(52) U.S. Cl.
CPC ............ *G06N 3/08* (2013.01); *G06F 16/5854* (2019.01); *G06N 20/00* (2019.01); *G06N 5/022* (2013.01)

(58) Field of Classification Search
CPC ......... G06F 17/30528; G06F 17/30268; G06F 17/30554; G06F 17/30867; G06N 3/08
See application file for complete search history.

(56) References Cited

U.S. PATENT DOCUMENTS

| 6,011,864 A | 1/2000 | Wu et al. |
| 7,660,464 B1 | 2/2010 | Peterson |
| 8,341,195 B1 | 12/2012 | Cole et al. |
| 8,532,377 B2 * | 9/2013 | Skaff .................. G06F 17/3025 382/165 |
| 8,775,424 B2 * | 7/2014 | Skaff ................. G06F 17/30265 382/305 |

(Continued)

OTHER PUBLICATIONS

"First Action Interview Office Action", U.S. Appl. No. 14/938,660, dated Aug. 17, 2017, 3 pages.

(Continued)

*Primary Examiner* — Jeff A Burke
(74) *Attorney, Agent, or Firm* — SBMC

(57) ABSTRACT

Image search techniques and systems involving emotions are described. In one or more implementations, a digital medium environment of a content sharing service is described for image search result configuration and control based on a search request that indicates an emotion. The search request is received that includes one or more keywords and specifies an emotion. Images are located that are available for licensing by matching one or more tags associated with the image with the one or more keywords and as corresponding to the emotion. The emotion of the images is identified using one or more models that are trained using machine learning based at least in part on training images having tagged emotions. Output is controlled of a search result having one or more representations of the images that are selectable to license respective images from the content sharing service.

20 Claims, 7 Drawing Sheets

(56) References Cited

U.S. PATENT DOCUMENTS

| | | |
|---|---|---|
| 9,111,413 B2 | 8/2015 | Gagner et al. |
| 9,219,830 B1 | 12/2015 | Ciorba et al. |
| 9,449,521 B2* | 9/2016 | Dahlkvist .............. G06F 3/033 |
| 9,483,159 B2 | 11/2016 | Myslinski |
| 9,569,697 B1 | 2/2017 | McNerney et al. |
| 9,594,807 B2* | 3/2017 | Rappoport ........... G06Q 10/101 |
| 9,818,044 B2 | 11/2017 | Koch et al. |
| 9,916,538 B2* | 3/2018 | Zadeh ................... G06N 7/005 |
| 10,191,920 B1* | 1/2019 | Grundmann ....... G06K 9/00302 |
| 10,198,590 B2 | 2/2019 | Koch et al. |
| 10,249,061 B2 | 4/2019 | Koch et al. |
| 10,389,804 B2 | 8/2019 | Koch et al. |
| 2002/0118210 A1 | 8/2002 | Yuasa et al. |
| 2003/0084065 A1 | 5/2003 | Lin et al. |
| 2003/0122839 A1* | 7/2003 | Matraszek .............. G06F 16/58 345/581 |
| 2003/0128389 A1* | 7/2003 | Matraszek ........... G06K 9/6267 358/1.18 |
| 2003/0165269 A1* | 9/2003 | Fedorovskaya ......... G06F 16/50 382/189 |
| 2004/0085330 A1 | 5/2004 | Walker, Jr. et al. |
| 2004/0101212 A1* | 5/2004 | Fedorovskaya ...... G06K 9/6293 382/305 |
| 2005/0030315 A1 | 2/2005 | Cohen et al. |
| 2005/0080771 A1 | 4/2005 | Fish |
| 2008/0201144 A1* | 8/2008 | Song ................... G06K 9/00281 704/236 |
| 2009/0119756 A1 | 5/2009 | Acuna et al. |
| 2009/0285456 A1* | 11/2009 | Moon ................ G06K 9/00335 382/118 |
| 2009/0287657 A1 | 11/2009 | Bennett |
| 2010/0086215 A1* | 4/2010 | Bartlett .............. G06K 9/00335 382/197 |
| 2010/0250554 A1* | 9/2010 | Shu ........................ G06Q 30/02 707/748 |
| 2010/0296748 A1 | 11/2010 | Shechtman et al. |
| 2011/0038547 A1* | 2/2011 | Hill .................... G06K 9/00281 382/195 |
| 2011/0101104 A1 | 5/2011 | Flynn et al. |
| 2011/0102544 A1 | 5/2011 | Kim |
| 2011/0141258 A1* | 6/2011 | Song ................... G06K 9/00268 348/77 |
| 2011/0184950 A1* | 7/2011 | Skaff ................. G06F 17/30265 707/737 |
| 2011/0263946 A1* | 10/2011 | el Kaliouby ......... A61B 5/1128 600/300 |
| 2012/0054638 A1 | 3/2012 | Ingoldby et al. |
| 2012/0163710 A1* | 6/2012 | Skaff ................... G06F 17/3025 382/165 |
| 2012/0206471 A1 | 8/2012 | Sarnoff et al. |
| 2012/0257814 A1 | 10/2012 | Kohli et al. |
| 2012/0317657 A1* | 12/2012 | Glimcher ........... G06Q 30/0603 726/29 |
| 2013/0019257 A1 | 1/2013 | Tschernutter et al. |
| 2013/0070050 A1 | 3/2013 | Ha et al. |
| 2013/0246277 A1 | 9/2013 | Moseley et al. |
| 2014/0050408 A1* | 2/2014 | Balasubramanian ........................ G06K 9/00281 382/195 |
| 2014/0108931 A1 | 4/2014 | Howard et al. |
| 2014/0112556 A1* | 4/2014 | Kalinli-Akbacak .... G10L 25/63 382/128 |
| 2014/0129942 A1 | 5/2014 | Rathod |
| 2014/0177966 A1* | 6/2014 | Kaheel ............... G06K 9/00677 382/195 |
| 2014/0201126 A1* | 7/2014 | Zadeh .................... G06N 7/005 706/52 |
| 2014/0211034 A1 | 7/2014 | Tanaka |
| 2014/0212853 A1* | 7/2014 | Divakaran ............. G09B 19/00 434/236 |
| 2014/0212854 A1* | 7/2014 | Divakaran ............. G09B 19/00 434/236 |
| 2014/0229873 A1 | 8/2014 | Tremblay et al. |
| 2014/0280296 A1* | 9/2014 | Johnston ............ G06K 9/00302 707/769 |
| 2014/0333739 A1 | 11/2014 | Yang et al. |
| 2015/0036934 A1* | 2/2015 | Movellan ........... G06K 9/00302 382/197 |
| 2015/0049953 A1* | 2/2015 | Movellan ........... G06K 9/00302 382/197 |
| 2015/0099946 A1* | 4/2015 | Sahin ....................... A61B 5/16 600/301 |
| 2015/0116353 A1 | 4/2015 | Miura et al. |
| 2015/0193507 A1* | 7/2015 | Rappoport ........... G06Q 10/101 382/118 |
| 2015/0223731 A1* | 8/2015 | Sahin ....................... A61B 5/16 600/301 |
| 2015/0279224 A1* | 10/2015 | Dahlkvist .............. G06F 3/033 434/236 |
| 2015/0324394 A1 | 11/2015 | Becker et al. |
| 2015/0332118 A1* | 11/2015 | Wang .................. G06F 16/5854 382/203 |
| 2016/0055237 A1 | 2/2016 | Tuzel et al. |
| 2016/0098592 A1* | 4/2016 | Lee ....................... G06F 19/321 434/236 |
| 2016/0148080 A1* | 5/2016 | Yoo ...................... G06K 9/4628 382/157 |
| 2016/0259992 A1 | 9/2016 | Knodt et al. |
| 2016/0300274 A1* | 10/2016 | Dolen ................ G06Q 30/0282 |
| 2017/0011489 A1 | 1/2017 | Van Leeuwen et al. |
| 2017/0131876 A1 | 5/2017 | Koch et al. |
| 2017/0131877 A1 | 5/2017 | Koch et al. |
| 2017/0132252 A1 | 5/2017 | Koch et al. |
| 2017/0132425 A1 | 5/2017 | Koch et al. |
| 2017/0132490 A1 | 5/2017 | Koch et al. |
| 2018/0077095 A1* | 3/2018 | Deyle ..................... H04L 51/10 |
| 2018/0204111 A1* | 7/2018 | Zadeh .................. G06N 3/0436 |

OTHER PUBLICATIONS

"Final Office Action", U.S. Appl. No. 14/938,628, dated Dec. 7, 2017, 28 pages.

"Restriction Requirement", U.S. Appl. No. 14/938,724, dated Jan. 8, 2018, 5 pages.

"Pre-Interview Communication", U.S. Appl. No. 14/938,628, dated Mar. 22, 2017, 3 pages.

"Pre-Interview Communication", U.S. Appl. No. 14/938,628, dated Apr. 3, 2017, 3 pages.

"Pre-Interview Communication", U.S. Appl. No. 14/938,660, dated Apr. 7, 2017, 3 pages.

"Non-Final Office Action", U.S. Appl. No. 14/938,781, dated Mar. 10, 2017, 9 pages.

"Non-Final Office Action", U.S. Appl. No. 14/938,724, dated Apr. 9, 2018, 14 pages.

"Non-Final Office Action", U.S. Appl. No. 14/938,690, dated Feb. 15, 2018, 20 pages.

"First Action Interview Office Action", U.S. Appl. No. 14/938,628, dated Jul. 26, 2017, 3 pages.

"Notice of Allowance", U.S. Appl. No. 14/938,781, dated Jul. 12, 2017, 7 pages.

"Non-Final Office Action", U.S. Appl. No. 14/938,690, dated Jul. 25, 2019, 33 pages.

"Notice of Allowance", U.S. Appl. No. 14/938,724, dated Oct. 19, 2018, 13 pages.

"Final Office Action", U.S. Appl. No. 14/938,690, dated Nov. 2, 2018, 19 pages.

"Notice of Allowance", U.S. Appl. No. 14/938,660, dated Apr. 4, 2019, 9 pages.

"Corrected Notice of Allowance", U.S. Appl. No. 14/938,628, dated Jan. 17, 2019, 7 pages.

"Final Office Action", U.S. Appl. No. 14/938,660, dated Dec. 21, 2018, 17 pages.

"Notice of Allowance", U.S. Appl. No. 14/938,628, dated Dec. 11, 2018, 10 pages.

"Final Office Action", U.S. Appl. No. 14/938,690, dated Dec. 23, 2019, 28 pages.

(56) References Cited

OTHER PUBLICATIONS

"Final Office Action", U.S. Appl. No. 14/938,660, dated May 8, 2018, 30 pages.
"Non-Final Office Action", U.S. Appl. No. 14/938,628, dated May 10, 2018, 27 pages.
"Non-Final Office Action", U.S. Appl. No. 14/938,660, dated Jul. 6, 2018, 34 pages.
"Examiner's Answer", U.S. Appl. No. 14/938,690, 9 pages.

* cited by examiner

300 

302
Obtain a plurality of training images, each of the training images is tagged as exhibiting a corresponding emotion 304
Train one or more models using machine learning as applied to the plurality of training images, the training performed to recognize the corresponding emotion exhibited by respective training images 306
Tag a plurality of subsequent images using the one or more models as indicative of respective emotions such that the tagged plurality of subsequent images are locatable based at least in part on the respective emotions as part of an image search

Fig. 3

500 

502
Receive a search request by a content sharing service that includes one or more keywords and that specifies an emotion

504
Locate one or more images available for licensing from the content sharing service by matching one or more tags associated with the image with the one or more keywords and as corresponding to the emotion, the emotion of the one or more images specified using one or more models that are trained using machine learning based at least in part on training images having tagged emotions

506
Control output of a search result formed as a result the locating, the search result having one or more representations of the one or more images that are selectable to license respective image from the content sharing service

*Fig. 5*

IMAGE SEARCH USING EMOTIONS

BACKGROUND

Content sharing services have been developed as a technique to provide an online marketplace for creative professionals to sell content, such as images. A creative professional, for instance, may capture or create images that are exposed via the content sharing services to potential customers such as marketing professionals, casual users, and so on. In one such example, a creative professional captures an image of a coworkers conversing next to a watercooler. The image is then uploaded and tagged for availability as part of the content sharing service such that a marketing professional performing a search for "office" and "watercooler" may locate the image. The content sharing service also includes functionality to make the image available for licensing in response to payment of a fee, e.g., as part of a subscription service, pay per use, and so forth.

Conventional techniques utilized to tag the images involve manual specification by a creative professional of particular tags that are then associated with the image. Thus, these conventional techniques rely on the creative professional to use tags that are also understood by prospective customers of the content sharing service in order to locate the image for licensing. As such, any disconnect between the prospective customers and the creative professional in agreement as to which words accurately describe an image may result in inefficiencies, such as to require repeated entry of different keywords to eventually find a tag used by the creative professional and even an inability to locate the image altogether. Thus, this may result in lost revenue to the creative professional and content sharing service as well as dissatisfaction by potential customers.

SUMMARY

Image search techniques and systems involving emotions are described. In one or more implementations, a digital medium environment of a content sharing service is described for image search result configuration and control based on a search request that indicates an emotion. The search request is received by the one or more computing devices that includes one or more keywords and that specifies the emotion. One or more images are located that are available for licensing from the content sharing service by matching one or more tags associated with the image with the one or more keywords and as corresponding to the emotion. The emotion of the one or more images is identified using one or more models that are trained using machine learning based at least in part on training images having tagged emotions. Output of a search result is controlled, the search result is formed as a result the locating by the one or more computing devices, the search result having one or more representations of the one or more images that are selectable to license respective said image from the content sharing service.

In one or more implementations, a digital medium environment of a content sharing service is described for generation and use of a model to form a search request that indicates an emotion. The system includes an emotion model generation module implemented at least partially in hardware of one or more computing devices to train one or more models using machine learning as applied to a plurality of training images, the training performed to recognize a corresponding emotion exhibited by respective said training images. The system also includes a sharing manager module implemented at least partially in hardware of one or more computing devices to locate one or more images available for licensing from the content sharing service based at least in part on the corresponding emotion exhibited by the one or more images, the corresponding emotion identified through use of the one or more models.

In one or more implementations, a digital medium environment is configured for generation of a model useable as part of image search result configuration to form a search request that indicates an emotion. A system is implemented by one or computing devices configured to perform operations that include obtaining a plurality of training images, each of the training images is tagged as exhibiting a corresponding emotion and training one or more models using machine learning as applied to the plurality of training images, the training performed to recognize the corresponding emotion exhibited by respective training images. The operations also include tagging a plurality of subsequent images using the one or more models as indicative of respective emotions such that the tagged plurality of subsequent images are locatable based at least in part on the respective emotions as part of an image search.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 3 depicts an example procedure in which a representative image is used by a content sharing service to interact with a collection of images provided as part of a search result.

FIG. 5 depicts an example procedure, and

DETAILED DESCRIPTION

Overview

Figure 1:
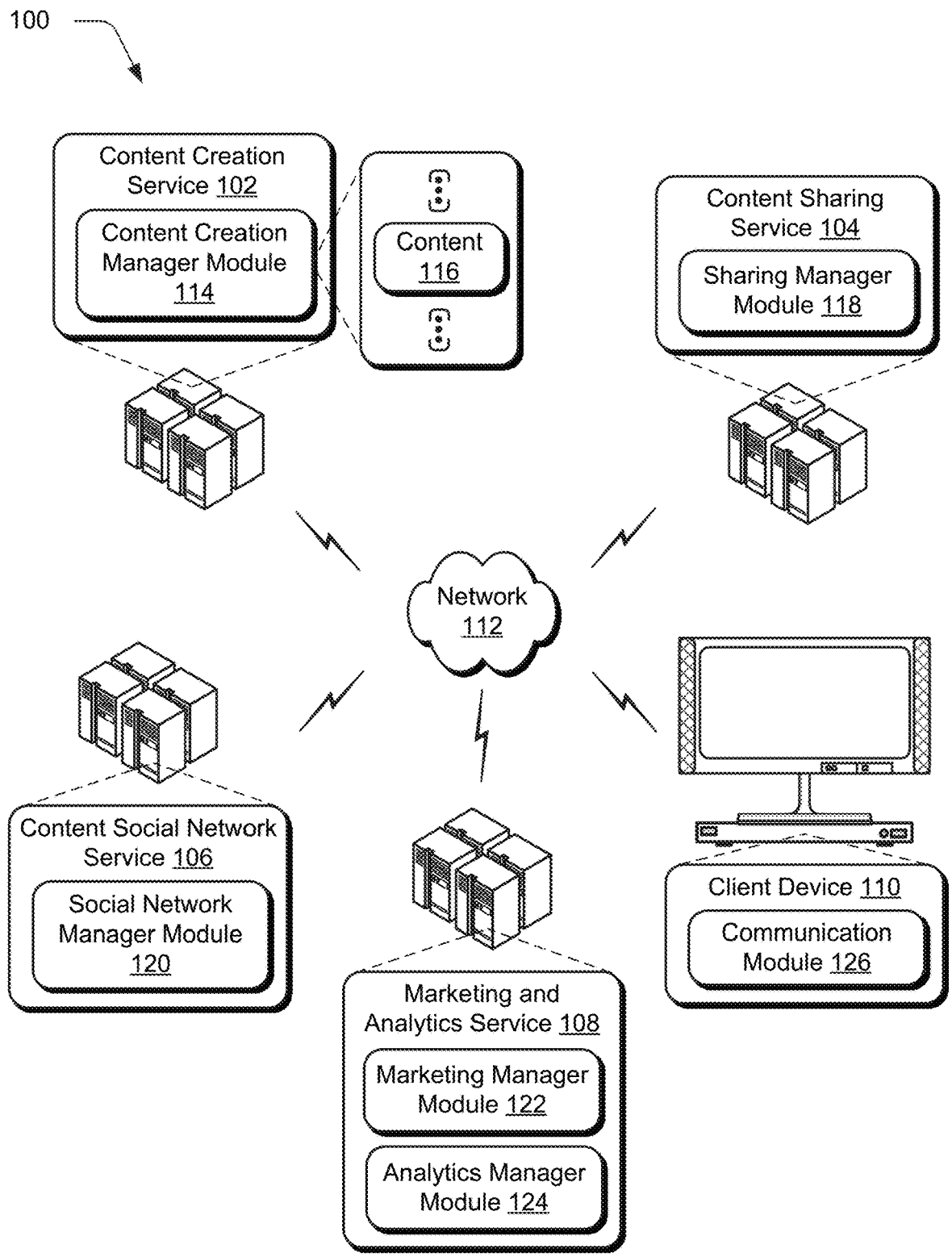
FIG. 1 is an illustration of an environment in an example implementation that is operable to employ content sharing collection and navigation techniques described herein.

Content sharing services are provided via a digital medium environment to unite content from creative professionals with consumers of the content, such as marketers. An example of this is the content sharing service is Adobe Stock™ by Adobe®, via which images are made available, e.g., via licensing, for users of the service. The images, for instance, may be made available as stock photos, including macro-stock images that are generally high-priced and exclusive, micro-stock which is relatively low priced and made available to wide range of consumers, and mid-stock which is priced between the two.

Keywords searches are the primary technique used by potential customers to find images within a content sharing service. In order to perform the search, the content sharing service matches keywords in a search request to tags associated with the images, often by a creative profession that uploaded the image for licensing. As such, these conventional search techniques rely on matching keywords used by potential customers to describe a desired image with tags used by creative professionals to describe images made available for licensing and thus are prone to error due to different perceptions of these users of the service. This error may be exacerbated in instances in which the keywords are not used to describe objects in the image (e.g., a businessman) but rather an emotion evoked by the image, e.g., authoritative, for there may be an even greater disconnect between creative professionals and potential customers about which images represent these emotions.

To solve these and other challenges of conventional digital medium environments, techniques and systems are described herein to leverage emotions as part of an image search. In this way, a user of the content sharing service may locate an image for licensing by searching for objects included in an image and also emotions represented by the images. In order to support such an image search, machine learning is applied to training images having tagged emotions in order to learn a model that may then be applied to tag subsequent images. These emotions may include core emotions such as happy, sad, surprise, contempt, fear, disgust, and anger that are identifiable through comparison to a set of predefined pose cues, such as to identify "happy" based on upturned corners of a subject's mouth in the image.

These techniques are also usable for non-core emotions that are not readily identifiable through a single set of motion cues. For example, a non-core emotion "authoritative" may be indicated by any one of crossed arms, a user scowling, a user pointing, a furrowed brow, and so forth and as such is not readily identifiable through a single set of predefined motion cues as is possible for core emotions. However, machine learning techniques described herein may also be applied to identify these non-core emotions and thus expand a range of emotions that are searchable within the content sharing service.

Once learned, the model may then be applied to subsequent images to tag the images, if appropriate, as corresponding to a particular emotion. These tags may then be used to support image searches based at least in part on emotion for images of a content sharing service. In this way, the content sharing service may increase a likelihood of accurate tagging of images automatically and without user intervention and help bridge potential gaps in understanding between a creative professional and potential customers. Further discussion of these and other examples is included in the following sections.

In the following discussion, an example environment is first described that is configured to employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. A digital medium environment is illustrated that is configured to generate and control suggestions usable to guide content creation. The illustrated environment 100 includes a content creation service 102, a content sharing service 104, a content social network service 106, a marketing and analytics service 108, and a client device 110 that are communicatively coupled, one to another, via a network 112. Although illustrated separately, functionality represented by the content creation service 102, the content sharing service 104, the content social network service 106, and the marketing and analytics service 108 are also combinable into a single entity, may be further divided across other entities that are communicatively coupled via the network 112, and so on.

Computing devices that are used to implement the content creation service 102, the content sharing service 104, the content social network service 106, the marketing and analytics service 108, and the client device 110 are configurable in a variety of ways. Computing devices, in one such instance, are configured as a desktop computer, a laptop computer, a mobile device (e.g., assuming a handheld configuration such as a tablet or mobile phone), and so forth. Thus, computing devices range from full resource devices with substantial memory and processor resources (e.g., personal computers, game consoles) to a low-resource device with limited memory and/or processing resources (e.g., mobile devices). Additionally, although a single computing device is shown in some instances, computing devices are also representative of a plurality of different devices, such as multiple servers utilized by a business to perform operations "over the cloud" as shown for the content creation service 102, the content sharing service 104, the content social network service 106, the marketing and analytics service 108, further discussion of which may be found in relation to FIG. 7.

The content creation service 102 is illustrated as including a content creation manager module 114 that is representative of functionality that is available via the network 112 to create and store content 116. The content creation manager module 114 provides a variety of functionality that is related to the creation of content 116. Examples of this functionality include graphic design, video editing, web development, image creation and processing, sound data processing, photography, and so forth. For example, functionality supported by the content creation manager module 114 includes digital motion graphics and compositing applications, digital audio editors, GUI web development application, animation design, web design, multimedia authoring applications, application-authoring applications, a vector graphics editor, desktop publishing applications, webpage and web development applications, raster-graphics editing applications, a real-time timeline-based video editing application, and so forth.

The content sharing service 104 includes a sharing manager module 118. The sharing manager module 118 is representative of functionality to unite content of creative professionals with consumers of the content, such as marketers, via an online service. An example of this is the content sharing service Adobe Stock™ by Adobe®, via which images are made available, e.g., via licensing, for users of the service. The images, for instance, may be made available as stock photos, including macro-stock images that are generally high-priced and exclusive, micro-stock which is relatively low priced and made available to wide range of consumers, and mid-stock which is priced between the two. Functionality of the sharing manager module 118 may include support of searches to locate desired images, pricing techniques, digital rights management (DRM), and generation of content creation suggestions.

The content social network service 106 as illustrated includes a social network manager module 120 that is representative of functionality to implement and manage a content social network service. An example of this is an online social-media based portfolio service for content creators (e.g., Behance®) that is usable by consumers to locate content professionals through examples of content created by the professionals.

The environment 100 also includes a marketing and analytics service 108. The marketing and analytics service 108 includes a marketing manager module 122 that is representative of functionality involving creation and tracking of marketing campaigns and the analytics manager module 124 is representative of functionality to analyze "big data," e.g., posts from a social network service. For example, marketing activities may be utilized to increase awareness of a good or service. This includes making potential consumers aware of the good or service as well as making the potential consumers aware of characteristics of the good or service, even if the potential consumers already own the good. An advertiser, for instance, generates a marketing activity to indicate functionality that is available from the good or service to increase usage and customer satisfaction.

Marketing activities take a variety of different forms, such as online marketing activities may involve use of banner ads, links, webpages, online videos, communications (e.g., emails, status posts, messaging), and so on that may be accessed via the Internet or otherwise. Marketing activities are also be configured for use that does not involve the Internet, such a physical fliers, television advertising, printed advertisements, billboard display (e.g., at a sporting event or along a side of a road), and so forth.

The marketing manager module 122 includes functionality to configure content 116 for inclusion as part of a marketing activity as well as track deployment of the content 116 as part of the marketing activity. The marketing manager module 122, for instance, may embed digital rights management functionality (e.g., a tracking monitor) to track the deployment of the content 116, e.g., to determine a number of times accessed by potentials customers, how and when accessed, identities of who accessed the content, and so forth as processed by the analytics manager module 124.

The client device 110 is illustrated as including a communication module 126 that is representative of functionality to access the content creation service 104, content sharing service 104, content social network service 106, marketing and analytics service 108, and/or content 116 (e.g., available at an online store) via the network 112. The communication module 126, for instance, may be configured as a browser, a web-enabled application, and so on. As such the client device 110 may be utilized by creative professionals to create the content 116, consumers of the content sharing service 104 to gain rights to use the content 116 (e.g., marketers), consume the content 116 (e.g., as part of viewing a marketing activity), and so forth. A variety of other arrangements of functionality represented by the entities of the environment 100 of FIG. 1 are also contemplated without departing from the spirit and scope thereof. Having now described an environment that is usable to implement the techniques described herein, examples of the content creation and sharing integration are described in the following.

Figure 2:
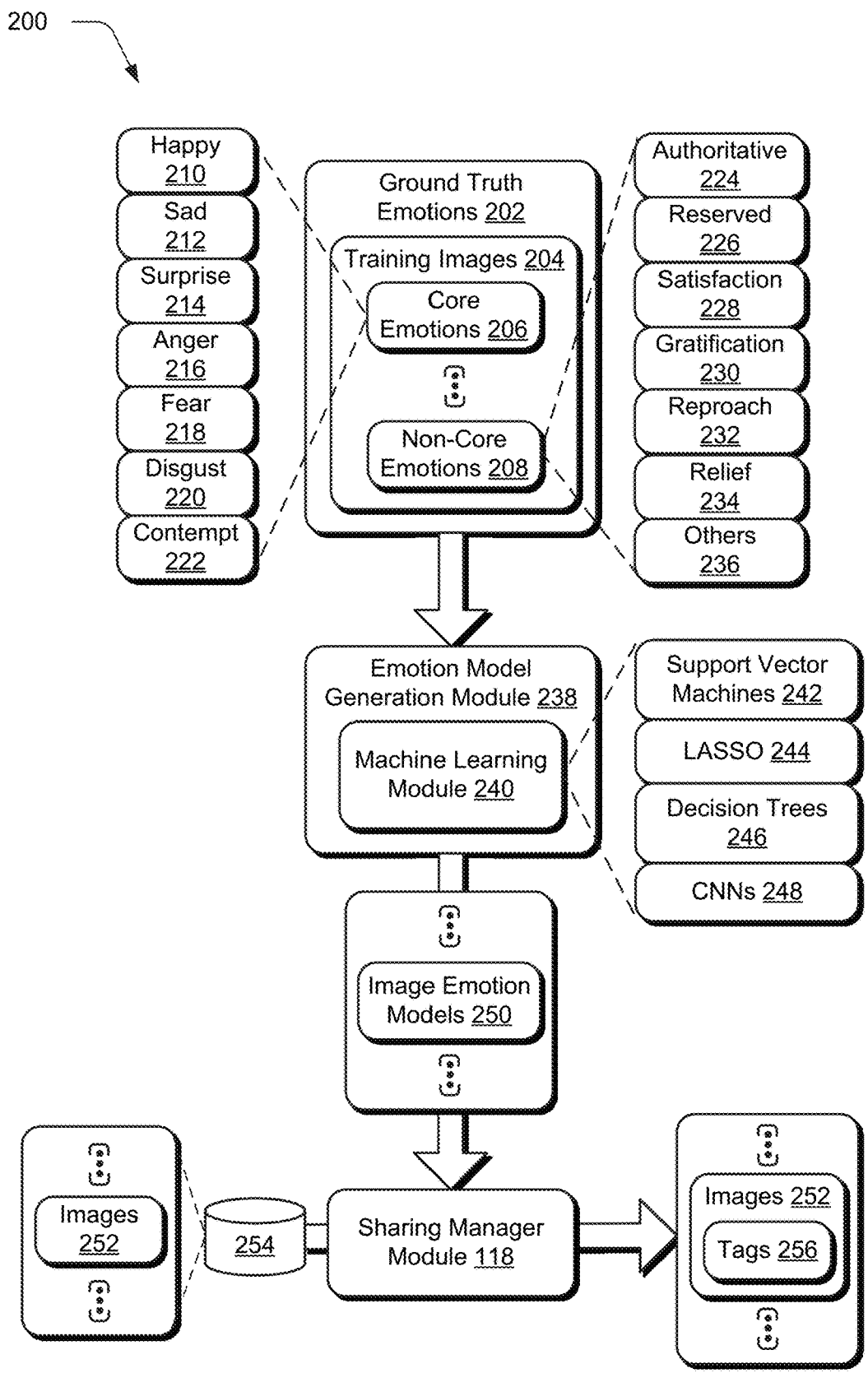
FIG. 2 depicts an example system.

FIG. 2 depicts an example system 200 and FIG. 3 depicts an example procedure 300, in which a model is learned using machine learning that is usable to tag images as corresponding to one or more emotions. In this way, functionality available as part of image searching is expanded to include emotions.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

The example system 200 may be implemented at whole in or part (e.g., distributed) in a variety of ways, such as by the content creation service 102, content sharing service 104, content social network service 106, marketing and analytics service 108, and/or client device 110 of FIG. 1. To begin, a plurality of training images are obtained, each of the training images tagged as exhibiting a corresponding emotion (block 302). For example, ground truth emotions 202 for learning a model are provided via a plurality of training images 204, each of which is tagged (e.g., manually by one or more users of a test group) as evoking one or more emotions. These emotions may include core emotions 206 and/or non-core emotions 208.

Core emotions 206 are classifications used for universal facial expressions, which typically include six emotions including happy 210, sad 212, surprise 214, anger 216, fear 218, and disgust 220, with contempt 222 sometimes added as a seventh core emotion. Each of these core emotions 206 is identifiable based on matching performed of a subject user with a respective one of a plurality of sets of predefined motion cues. For example, happy 210 is identifiable through raising the corners of a user's mouth; sad 212 is recognizable by a lowering of the mouth corners and raising an inner portion of a user's brows; surprise 214 is recognizable by a brow arch with eyes opened wide and a slight jaw drop; fear 218 is identifiable through raised brows, eyes open, and a slightly open mouth; disgust 220 is identifiable through a raised upper lip, wrinkled nose bridge, and raised cheeks, and contempt 222 is identifiable through a wrinkled and lowered brow with a pinched mouth. Thus, each of these core emotions 206 is identifiable by determining which single set of predefined motion cues are satisfied, if any, by a subject user in an image.

Non-core emotions 208, on the other hand, are not readily identifiable through comparison with a single set of predefined motion cues. For example, non-core emotions 208 such as authoritative 224, reserved 226, satisfaction 228, gratification 230, reproach 232, relief 234, and others 235 such as confident, resentment and gloating are identifiable using different combinations of cues. As shown in an example user interface 600 of FIG. 6, for instance, different examples of a non-core emotion 208 "confident" are shown. These include wide open eyes and a pointing finger with a lowered chin and raised brows as shown in image 602; a raised chin and crossed arms in image 604; and crossed arms, lowered brows, and a slight smirk as shown in image 606. Thus, as shown in this example a single set of cues is generally insufficient to identify non-core emotions, which may also involve cues from other body parts other than a user's face. However, through use of the machine learning techniques described herein both core and non-core emotions 206, 208 are identifiable as further described below.

One or more models are trained using machine learning as applied to the plurality of training images. The training is performed to recognize the corresponding emotion exhibited by respective training images (block 304). In the illustrated system 200, an emotion model generation module 238 obtains the ground truth emotions 202, such as those corresponding to a single core or non-core emotion 208. A machine learning module 240 is then employed to process the corresponding training images 204. A variety of machine learning techniques may be used by the machine learning module 240, such as support vector machines 242, LASSO 244, decision trees 246, or convolutional neural networks (CNNs) 248.

Regardless of which technique used, image emotion models 250 are trained individually in this example for respective ones of the plurality of core and/or non-core emotions 206, 208. Other examples are also contemplated in which a single image emotion model 250 is usable to identify two or more emotions, e.g., for related or diametrically opposed emotions.

A plurality of subsequent images are tagged using the one or more models as indicative of respective emotions such that the tagged plurality of subsequent images are locatable based at least in part on the respective emotions as part of an image search (block 306). For example, the sharing manager module 118 may take images 252 available for licensing and illustrated as stored in storage 254 and use the image emotion models 250 to associate tags 256 with the images 252 that are indicative of emotions evoked by the images 252. These tags may then be used to locate respective images as part of a keyword search as further described in relation to FIGS. 4-6.

As part of tagging performed by the sharing manager module 118, natural language processing and sentiment extraction from captions and tag phrases may also be performed to generate tags 256 and thus increase a likelihood of capturing emotions that are relevant to the images 252. Tags 256 may be configured according to domain independent and/or domain-specific sentiment lexicon to enable users to search images by emotion, mood, or any expressed affective attribute. Further, the use of this emotion/affect lexicon ontology supports an increase in abstraction of emotions supported by an image search, e.g., "find images that convey joy", where the affective lexicon ontology provides semantic relationships for emotion generalization (hypernyms, synonyms) and facial expression associations:

("smile", "implies", "happy"); and
("happy", "synonym", "joyful").

Additionally, a word embedding model may also be trained on an emotion text, then an image search system can learn how emotions associate with specific scenes, e.g., birthday party scenes equal "happy," "surprise." This combined with the affect lexicon supports a hybrid image search system that may use both ontology-based reasoning and statistical inferencing for image searches involving emotion. The following describes an example of a search performed using the tagged 256 images 252.

Figure 4:
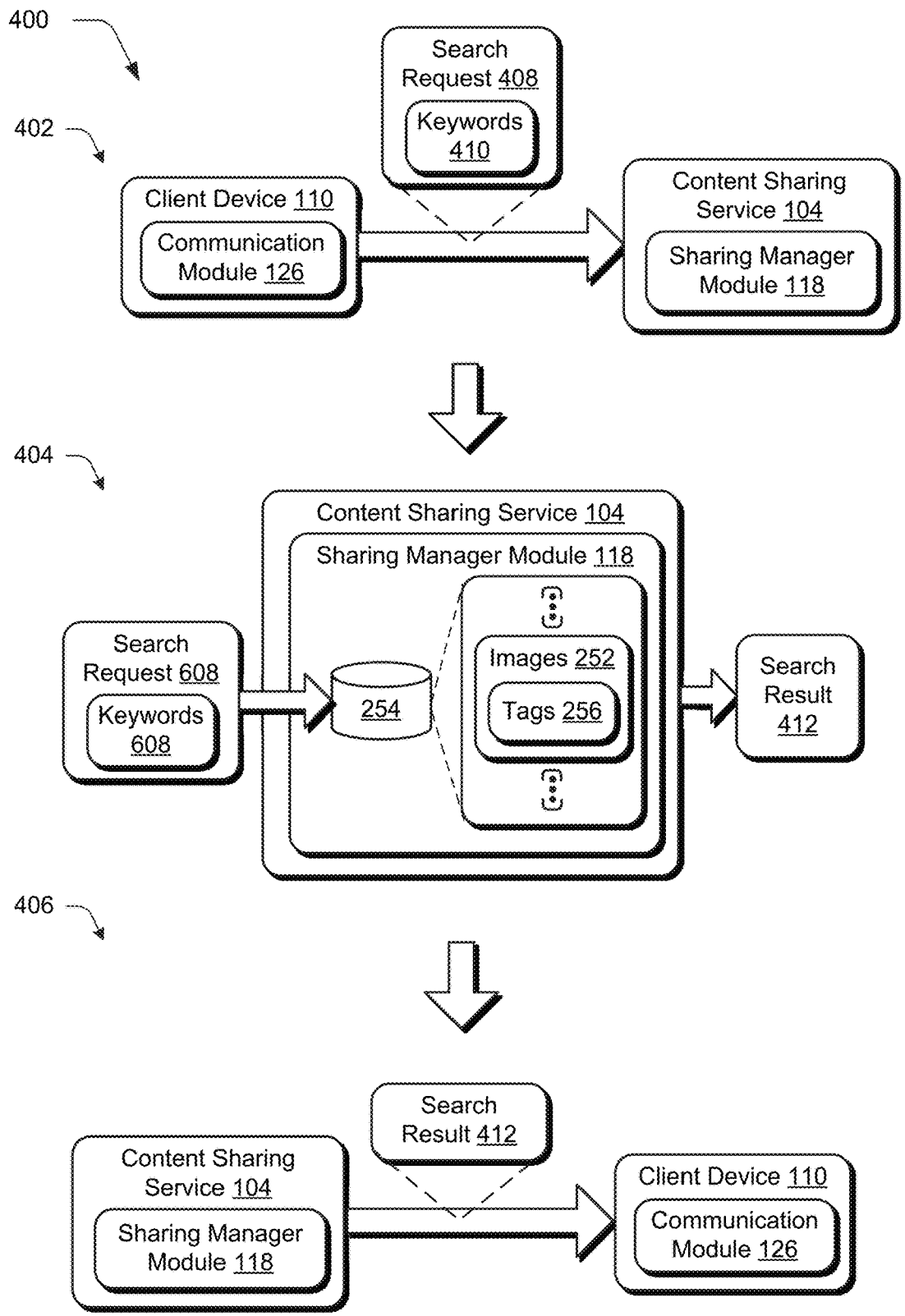
FIG. 4 depicts an example system.
Figure 6:
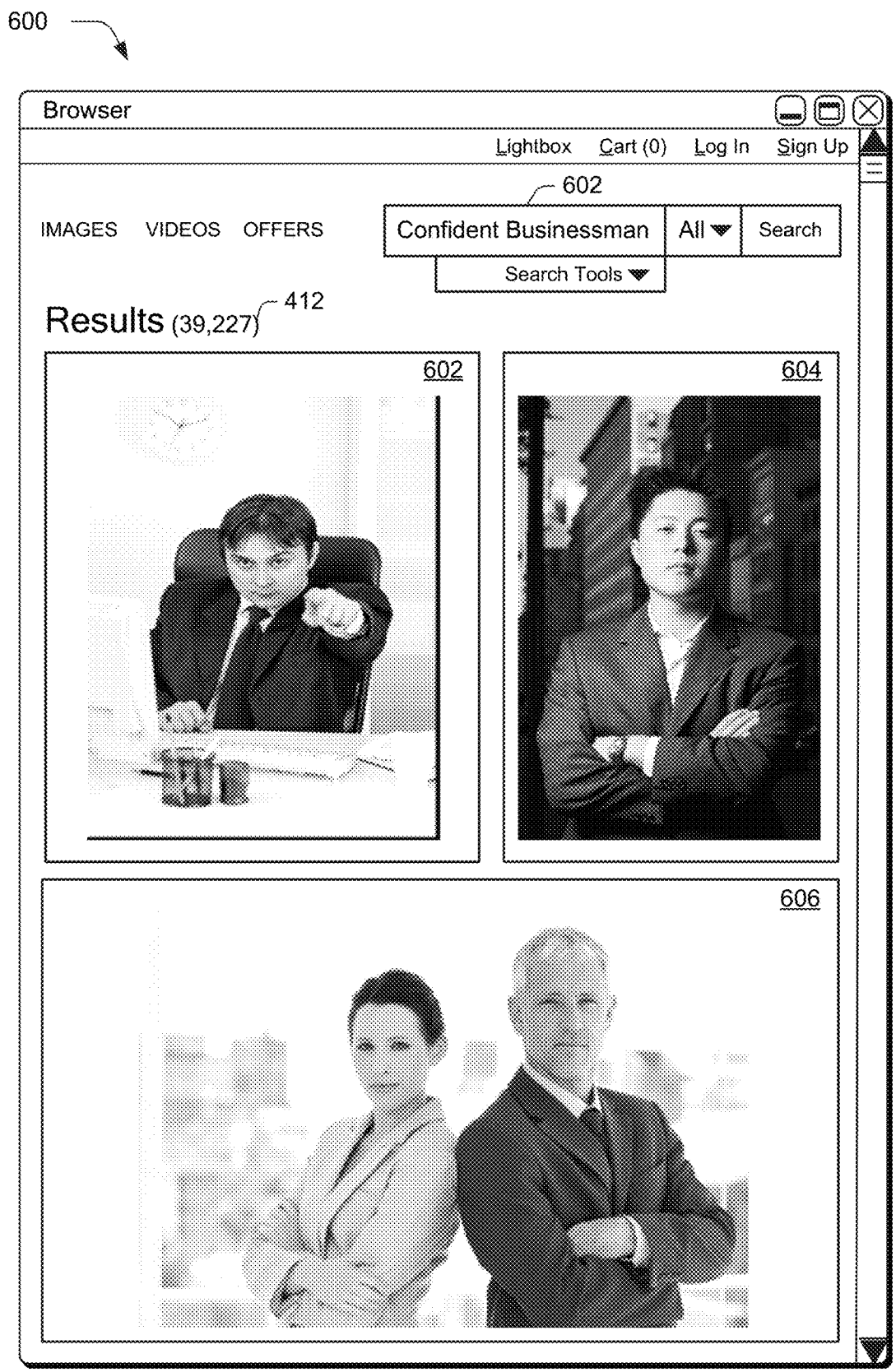
FIG. 6 depicts an example user interface in which an image search involving emotion is performed by leveraging tags associated with images of a content sharing service using machine learning.

FIG. 4 depicts an example system 400, FIG. 5 depicts an example procedure 500, and FIG. 6 depicts an example user interface 600 in which an image search involving emotion is performed by leveraging tags associated with images of the content sharing service 104 using machine learning In this way, functionality available as part of image searches is expanded to include emotions. The system 400 is illustrated using first, second, and third stages 402, 404, 406.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

To begin with in this example, a content sharing service receives a search request that includes one or more keywords and that specifies an emotion (block 502). As shown at the first stage 402, for instance, a client device 110 communicates a search request 408 to a content sharing service 104. The search request 408 includes keywords 410 that may describe objects that are desired for inclusion in the image (i.e., the subject matter of the image) as well as an emotion that is to be evoked by the image, such as for a "confident businessman." Both core and non-core emotions 206, 208 may be specified as part of the search request.

One or more images are located that are available for licensing from the content sharing service by matching one or more tags associated with the image with the one or more keywords and as corresponding to the emotion. The emotion of the one or more images is identified using one or more models that are trained using machine learning based at least in part on training images having tagged emotions (block 504). The sharing manager module 118, for instance, may match keywords 608 to tags 256 of images to generate a search result 412. The tags 256 in this example are generated offline for association with the images 252 as previously described in relation to FIGS. 2 and 3.

As previously described, tags 256 may be configured according to domain independent and/or domain-specific sentiment lexicon to enable users to search images by emotion, mood, or any expressed affective attribute. The use of this emotion/affect lexicon ontology supports an increase in abstraction of emotions supported by an image search, e.g., "find images that convey joy", where the affective lexicon ontology provides semantic relationships for emotion generalization (hypernyms, synonyms) and facial expression associations.

Output is controlled of a search result formed as a result of the locating, the search result having one or more representation of the one or more images that are selectable to license respective images form the content sharing service (block 506). As illustrated at the third stage 406, the search result 412 is communicated and caused to be displayed by the client device 110. In this way, machine learning may be employed to locate images 252 that evoke an emotion in a user in a variety of different ways, an example of which is discussed in the following.

FIG. 6 depicts an example of a user interface 600 that displays the search result 412 of FIG. 4. A search request 602 "confident businessman" has been entered into the user interface 600, and in response, results 412 are obtained that include representations of images available for licensing from the content sharing service 104. Thus, the search result specifies an object (i.e., the subject matter) of "businessman" that is to be included in the image and also a non-core emotion 208 "confident" that is to be evoked by the subject matter.

The "confident" emotion is evoked in a variety of ways in the search result 412. For example, image 602 evokes confidence through wide open eyes and a pointing finger of a businessman with a lowered chin and raised brows; a raised chin and crossed arms are used for a businessman in image 604; and crossed arms, lowered brows, and a slight smirk as shown for the businessman and woman in image 606. In this way, the machine learning techniques may identify non-core emotions through a wide range of cues, and is also usable to identify core emotions as further described above.

Example System and Device

Figure 7:
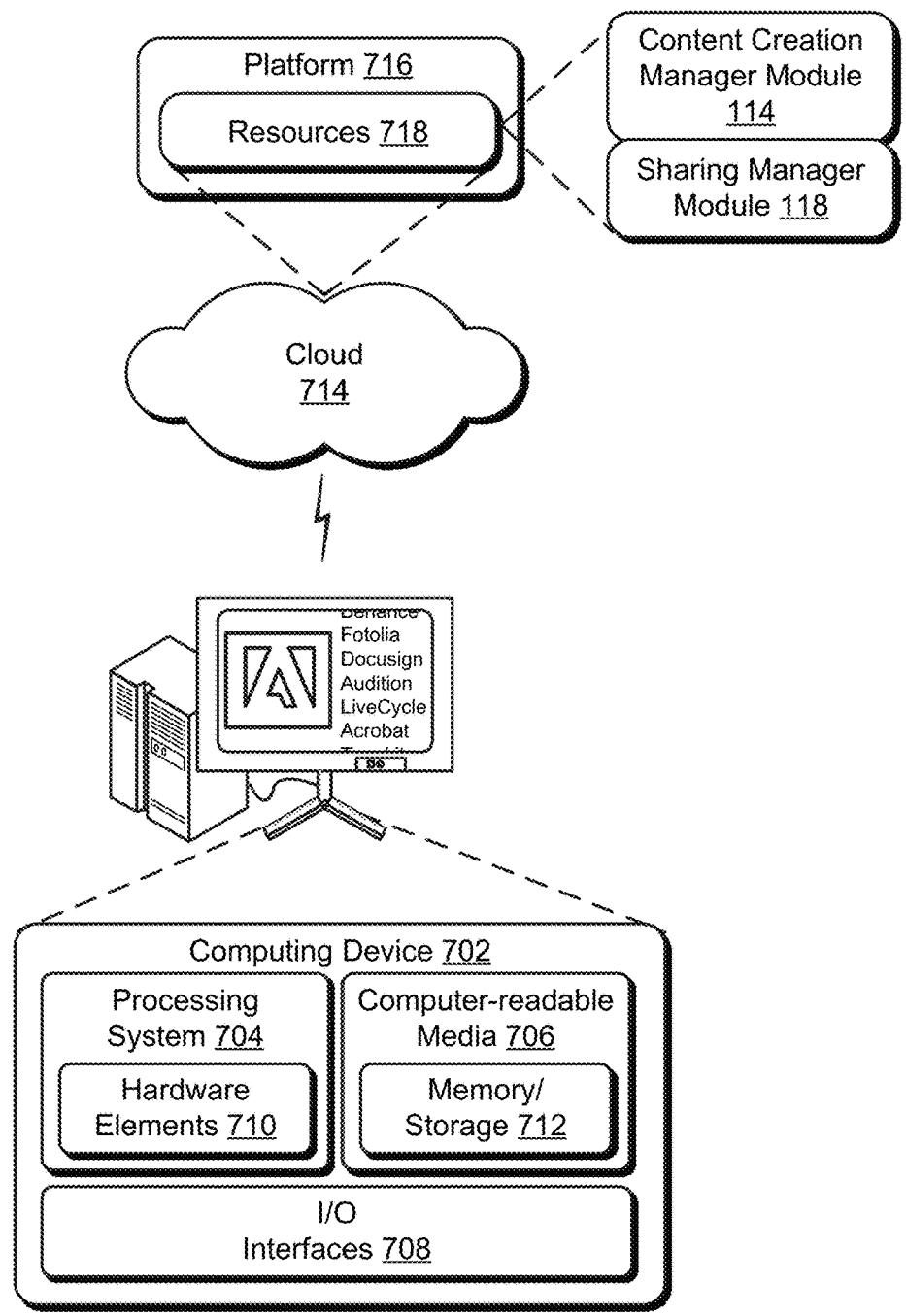
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the content creation manager module 114 and the sharing manager module 118. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment of a content sharing service for image search result configuration and control based on a search request that indicates an emotion, a method implemented by one or more computing devices comprising:

receiving the search request by the one or more computing devices that includes one or more keywords and that specifies the emotion;

locating one or more images available from the content sharing service by matching one or more tags associated with the image with the one or more keywords and as corresponding to the emotion, the locating based on:

a core emotion model to identify a core emotion using a single set of predefined pose cues for each of multiple different core emotions, the core emotion identified by determining, for each core emotion, if the respective single set of predefined pose cues is satisfied, the predefined pose cues used to identify the core emotions each corresponding to different facial features and not including body parts other than said facial features; and a non-core emotion model to identify a non-core emotion that is identifiable using different combinations of multiple sets of predefined pose cues for each of multiple different non-core emotions, the predefined pose cues used to identify the non-core emotions including at least one body part other than a face or a head, the non-core emotion identified by determining, for each non-core emotion, if the respective at least one of the different combinations of multiple sets of predefined pose cues is satisfied, the non-core emotion model trained using machine learning; and controlling output of a search result formed as a result of the locating by the one or more computing devices, the search result having one or more representations of the one or more images that are selectable to license a respective said image from the content sharing service.

2. The method as described in claim 1, wherein the machine learning includes use of decision trees, LASSO, support vector machines, or convolutional neural networks (CNNs).

3. The method as described in claim 1, wherein the emotion is a core emotion that is identifiable based on matching performed of a subject user included in a respective said image with a respective one of the predefined pose cues.

4. The method as described in claim 1, wherein the emotion is a core emotion that includes happy, sad, surprise, contempt, fear, disgust, or anger.

5. The method as described in claim 1, wherein the emotion is a non-core emotion.

6. The method as described in claim 1, wherein the emotion is a non-core emotion corresponding to authoritative, reserved, satisfaction, gratification, reproach, relief, confident, resentment, gloating.

7. The method as described in claim 1, wherein the body parts other than the face or the head include at least one arm, at least one hand, or at least one finger.

8. The method as described in claim 1, wherein the core emotions include happy, sad, and anger.

9. The method as described in claim 1, wherein the core emotions include happy, sad, and anger.

10. In a digital medium environment of a content sharing service for generation and use of a model to form a search request that indicates an emotion, a system comprising:

an emotion model generation module implemented at least partially in hardware of one or more computing devices to train one or more models using machine learning as applied to a plurality of training images, the training including:

training a core emotion model to identify a core emotion using a single set of predefined pose cues for each of multiple different core emotions by determining, for each core emotion, if the respective single set of predefined pose cues is satisfied, the predefined pose cues for each of the multiple different core emotions corresponding to different facial features and not including body parts other than said facial features; and training a non-core emotion model to identify a non-core emotion using different combinations of multiple sets of predefined pose cues for each of multiple different non-core emotions by determining, for each non-core emotion, if the respective at least one of the different combinations of multiple sets of predefined pose cues is satisfied, the predefined pose cues for the multiple different non-core emotions including at least one body part other than a face or a head; and a sharing manager module implemented at least partially in hardware of one or more computing devices to locate one or more images available for licensing from the content sharing service based at least in part on the corresponding emotion exhibited by the one or more images, the emotion identified through use of the one or more models.

11. The system as described in claim 10, wherein the machine learning includes use of decision trees, LASSO, support vector machines, or convolutional neural networks (CNNs).

12. The system as described in claim 10, wherein the core emotion includes happy, sad, surprise, contempt, fear, disgust, or anger.

13. The system as described in claim 10, wherein the emotion is a non-core emotion.

14. The system as described in claim 10, wherein the predefined pose cues used to identify the non-core emotions further includes facial features.

15. The system as described in claim 10, wherein the body parts other than the face or the head include at least an arm, a hand, or a finger.

16. In a digital medium environment for generation of a model useable as part of image search result configuration to form a search request that indicates an emotion, a system implemented by one or computing devices configured to perform operations comprising:

obtaining a plurality of training images, each of the training images is tagged as exhibiting a corresponding emotion;

training one or more models using machine learning as applied to the plurality of training images, the training performed to recognize the corresponding emotion exhibited by respective said training images, the training including:

training a core emotion model to identify a core emotion using a single set of predefined cues for each of multiple different core emotions; by determining, for each core emotion, if the respective single set of predefined pose cues is satisfied, the predefined pose cues for each of the multiple different core emotions corresponding to different facial features and not including body parts other than said facial features; and training a non-core emotion model to identify a non-core emotion using different combinations of multiple sets of predefined cues for each of multiple different non-core emotions by determining, for each non-core emotion, if the respective at least one of the different combinations of multiple sets of predefined pose cues is satisfied, the predefined pose cues for the multiple different non-core emotions including at least one body part other than a face or a head; and tagging a plurality of subsequent images using the one or more models as indicative of respective said emotions such that the tagged plurality of subsequent images are locatable based at least in part on the respective said emotions as part of an image search.

17. The system as described in claim 16, wherein the machine learning includes use of decision trees, LASSO, support vector machines, or convolutional neural networks (CNNs).

18. The system as described in claim 16, wherein the emotion is a core emotion that is identifiable based on matching performed of a subject user included in a respective said image with a respective one of the predefined pose cues plurality of sets of predefined motion cues.

19. The system as described in claim 16, wherein the emotion is a core emotion that includes happy, sad, surprise, contempt, fear, disgust, or anger.

20. The system as described in claim 16, wherein the emotion is a non-core emotion.

\* \* \* \* \*

UNITED STATES PATENT AND TRADEMARK OFFICE
CERTIFICATE OF CORRECTION

PATENT NO. : 10,783,431 B2
APPLICATION NO. : 14/938752
DATED : September 22, 2020
INVENTOR(S) : Zeke Koch et al.

Page 1 of 1

It is certified that error appears in the above-identified patent and that said Letters Patent is hereby corrected as shown below:

In the Claims

Column 14, Line 42, after "predefined pose cues", delete "plurality of sets of predefined motion cues", therefor.

Signed and Sealed this
Eighth Day of December, 2020

Andrei Iancu
*Director of the United States Patent and Trademark Office*